United States Patent
Kweon et al.

(10) Patent No.: US 11,496,581 B2
(45) Date of Patent: Nov. 8, 2022

(54) APPARATUS AND METHOD FOR SUPPORTING UPF EVENT EXPOSURE SERVICE IN WIRELESS COMMUNICATION SYSTEM

(71) Applicant: Samsung Electronics Co., Ltd., Suwon-si (KR)

(72) Inventors: Kisuk Kweon, Suwon-si (KR); Sangsoo Jeong, Suwon-si (KR); Jungshin Park, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/249,573

(22) Filed: Mar. 5, 2021

(65) Prior Publication Data
US 2021/0281658 A1    Sep. 9, 2021

(30) Foreign Application Priority Data
Mar. 6, 2020    (KR) .......................... 10-2020-0028450

(51) Int. Cl.
*H04L 67/30* (2022.01)
*H04L 67/51* (2022.01)

(52) U.S. Cl.
CPC .............. *H04L 67/30* (2013.01); *H04L 67/51* (2022.05)

(58) Field of Classification Search
CPC ................. H04L 67/16; H04L 67/30

USPC ......................................................... 709/245
See application file for complete search history.

(56) References Cited

U.S. PATENT DOCUMENTS

| | | |
|---|---|---|
| 2019/0021064 A1 | 1/2019 | Ryu et al. |
| 2019/0239280 A1 | 8/2019 | Li et al. |
| 2020/0068047 A1 | 2/2020 | Huang et al. |

FOREIGN PATENT DOCUMENTS

| | | | |
|---|---|---|---|
| WO | 2019055518 A1 | 3/2019 | |
| WO | WO-2020186145 A1 * | 9/2020 | ............. H04L 67/34 |
| WO | WO-2020224791 A1 * | 11/2020 | ............. H04W 8/20 |
| WO | WO-2021045573 A1 * | 3/2021 | |

OTHER PUBLICATIONS

3GPP, Technical Specification (TS) 23.502, Dec. 2019, 3GPP, v16.3.0 (Year: 2019).*

(Continued)

*Primary Examiner* — Zi Ye (57) ABSTRACT

The disclosure relates to a $5^{th}$ generation (5G) or pre-5G communication system for supporting a higher data transmission rate than a $4^{th}$ generation (4G) communication system such as Long Term Evolution (LTE). According to various embodiments, there is provided an operating method of an application function (AF) in a wireless communication system that includes: transmitting, to a network exposure function (NEF), a Nnef_EventExposure_Subscribe message including an address of a user equipment (UE) to request a subscription of a user plane function (UPF) event exposure service for the UE; and receiving, from the NEF, a Nnef_EventExposure_Notify message including information on the UPF event exposure service for the UE.

8 Claims, 8 Drawing Sheets

(56) References Cited

OTHER PUBLICATIONS

Itectec, 6.4 Network Exposure to Edge Application Server, 2021, Itectec.com, https://itectec.com/spec/6-4-network-exposure-to-edge-application-server/ (Year: 2021).*

3GPP 5G, ETSI TS 129 521 v15.3.0, Apr. 2019, ETSI.org, https://www.etsi.org/deliver/etsi_ts/129500_129599/129521/15.03.00_60/ts_129521v150300p.pdf (Year: 2019).*

International Search Report and Written Opinion of the International Searching Authority dated Jun. 17, 2021 in connection with International Application No. PCT/KR2021/002//6, 8 pages.

CT3, "LS on Nsmf_EventExposure and Nnef_EventExposure service handling of the "Downlink data delivery status" and "Availability after DDN Failure" events," S2-1906839 (revision of S2-1904878), SA WG2 Meeting S2#134, Sapporo, Japan, Jun. 24-28, 2019, 3 pages.

NGMN Alliance, "Service-Based Architecture in 5G Case Study and Deployment Recommendations," Version 2, Final Deliverable (approved), Jun. 14, 2019, 24 pages.

\* cited by examiner

APPARATUS AND METHOD FOR SUPPORTING UPF EVENT EXPOSURE SERVICE IN WIRELESS COMMUNICATION SYSTEM

CROSS-REFERENCE TO RELATED APPLICATION

This application is based on and claims priority under 35 U.S.C. 119 to Korean Patent Application No. 10-2020-0028450, filed on Mar. 6, 2020, in the Korean Intellectual Property Office, the disclosure of which is herein incorporated by reference in its entirety.

BACKGROUND

1. Field

The disclosure relates generally to a wireless communication system and, more particularly, to an apparatus and a method for supporting a UPF event exposure service in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The above information is presented as background information only to assist with an understanding of the disclosure. No determination has been made, and no assertion is made, as to whether any of the above might be applicable as prior art with regard to the disclosure.

SUMMARY

Based on the foregoing discussion, the disclosure provides an apparatus and a method for supporting a UPF event exposure service in a wireless communication system.

According to various embodiments, there is provided an operating method of an application function (AF) in a wireless communication system. The method includes: transmitting, to a network exposure function (NEF), a Nnef_EventExposure_Subscribe message including an address of a user equipment (UE) to request a subscription of a user plane function (UPF) event exposure service for the UE; and receiving, from the NEF, a Nnef_EventExposure_Notify message including information on the UPF event exposure service for the UE.

According to various embodiments, there is provided an operating method of a network exposure function (NEF) in a wireless communication system. The method includes: receiving, from an application function (AF), a Nnef_EventExposure_Subscribe message including an address of a user equipment (UE) to request a subscription of a user plane function (UPF) event exposure service for the UE; and transmitting, to the AF, a Nnef_EventExposure_Notify message including information on the UPF event exposure service for the UE.

According to various embodiments, there is provided an apparatus for an application function (AF) in a wireless communication system. The apparatus includes: a transceiver; and at least one processor operably coupled to the transceiver, and configured to: transmit, to a network exposure function (NEF), a Nnef_EventExposure_Subscribe message including an address of a user equipment (UE) to request a subscription of a user plane function (UPF) event exposure service for the UE; and receive, from the NEF, a Nnef_EventExposure_Notify message including information on the UPF event exposure service for the UE.

Various embodiments provide an apparatus and a method for supporting a UPF event exposure service in a wireless communication system.

Advantageous effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Further, in the disclosure, various embodiments will be described using terms used in some communication standards (e.g., 3rd Generation Partnership Project (3GPP)), but those terms are illustrated merely for the convenience of description. Various embodiments of the disclosure may be applied to other communication systems through modifications and changes.

Various embodiments relate to a method and an apparatus for supporting a user plane function (UPF) event exposure service in a wireless communication system.

Various embodiments provide a method for network functions (NFs) in a 5G core (5GC) or an external application function (AF) to use an event exposure service of a user plane function using a service-based interface (SBI).

As a variety of services can be provided with the development of a mobile communication system, a method for efficiently using a non-public network (NPN) is particularly required.

This disclosure proposes a method of subscribing to a UPF event exposure service in order to use the UPF event exposure service inside/outside a network. To this end, a network function (NF) inside/outside the network requests a subscription to a service from a UPF via a user data management (UDM) or a session management function (SMF). Here, a method of storing a UE Internet protocol (IP) address or a UE medium access control (MAC) address and a UPF identifier (ID) in the UDM is also proposed in order to discover the UPF.

Figure 1:
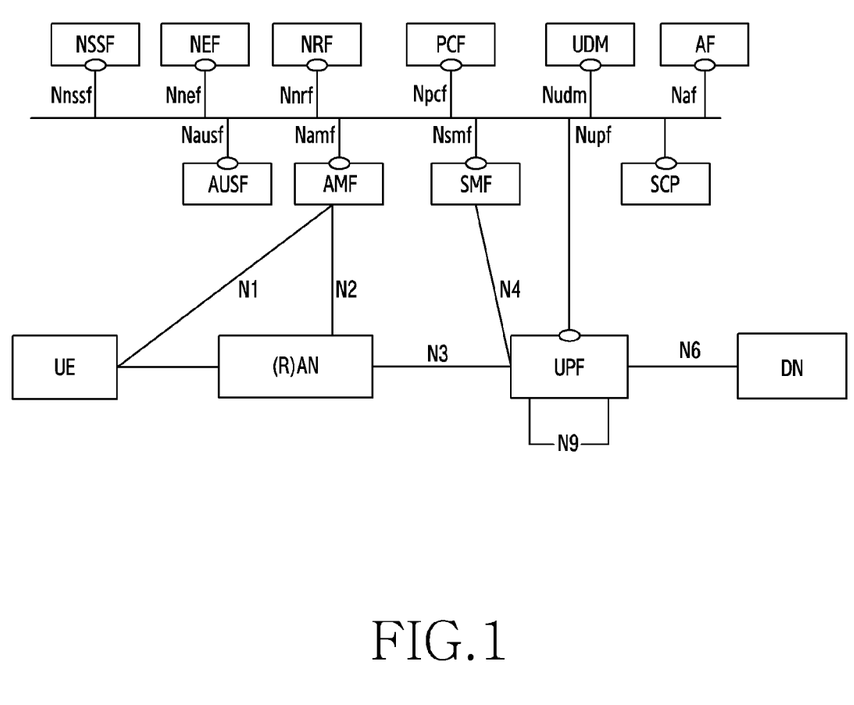
FIG. 1 illustrates the structure of a 5G network wireless communication system according to various embodiments.

FIG. 1 illustrates the structure of a 5G network wireless communication system according to various embodiments. A network entity or network nodes included in the 5G network wireless communication system are described as follows.

An access network (AN)—or, equivalently, a radio access network (RAN)—is an entity that performs radio resource allocation for a terminal and may be at least one of an evolved Node B (eNode B), a Node B, a base station (BS), a next-generation radio access network (NG-RAN), a 5G access network (5G-AN), a radio access unit or radio unit (RU), a base station controller, or a node on a network. A terminal may include a user equipment (UE), a next-generation UE (NG UE), a mobile station (MS), a cellular phone, a smartphone, a computer, or a multimedia system capable of performing a communication function. Although embodiments disclosed herein will be described below with reference to a 5G system as an example, the embodiments may be applied to other communication systems having a similar technical background. Further, the embodiments disclosed herein may be applied to other communication systems through some modifications without significantly departing from the scope of the disclosure, as determined by a skilled person having technical knowledge.

As a wireless communication system evolves from a 4G system to a 5G system, a new core network, such as a next-generation (NG) core or 5G core (5GC) network, is defined. The new core network virtualizes all existing network entities (NEs) into network functions (NFs). According to an embodiment, a network function may refer to a network entity, a network component, and a network resource.

According to an embodiment, a 5GC may include NFs illustrated in FIG. 1. The 5GC is not limited to the example of FIG. 1 and may include a greater number of NFs than those illustrated in FIG. 1 or a smaller number of NFs.

According to an embodiment, an access and mobility management function (AMF) may be a network function of managing the mobility of a terminal.

According to an embodiment, a session management function (SMF) may be a network function of managing a packet data network (PDN) connection provided for a terminal. The PDN connection may be referred to as a PDU session.

According to an embodiment, a policy control function (PCF) may be a network function of applying a mobile network operator's service policy, charging policy, and policy for a PDU session on a terminal.

According to an embodiment, a unified data management (UDM) may be a network function of storing information about a subscriber.

According to an embodiment, a network exposure function (NEF) may be a function of providing information about a terminal to a server outside a 5G network. In addition, the NEF may provide a function of providing information necessary for a service to the 5G network and storing the information in a unified data repository (UDR).

According to an embodiment, a user plane function (UPF) may be a function of serving as a gateway to transmit user data (protocol data unit or "PDU") to a data network (DN). Particularly, in the disclosure, Nupf, which is a service-based interface (SBI), is defined, and the UPF may provide an event exposure service to another NF through the SBI.

According to an embodiment, a network repository function (NRF) may perform a function of discovering an NF.

According to an embodiment, an authentication server function (AUSF) may perform terminal authentication in a 3GPP access network and a non-3GPP (non-3GPP) access network.

According to an embodiment, a network slice selection function (NSSF) may perform a function of selecting a network slice instance provided for a terminal.

According to an embodiment, a data network (DN) may be a data network through which a terminal transmits and receives data in order to use a service of a network operator or a service of a third party.

Figure 2:
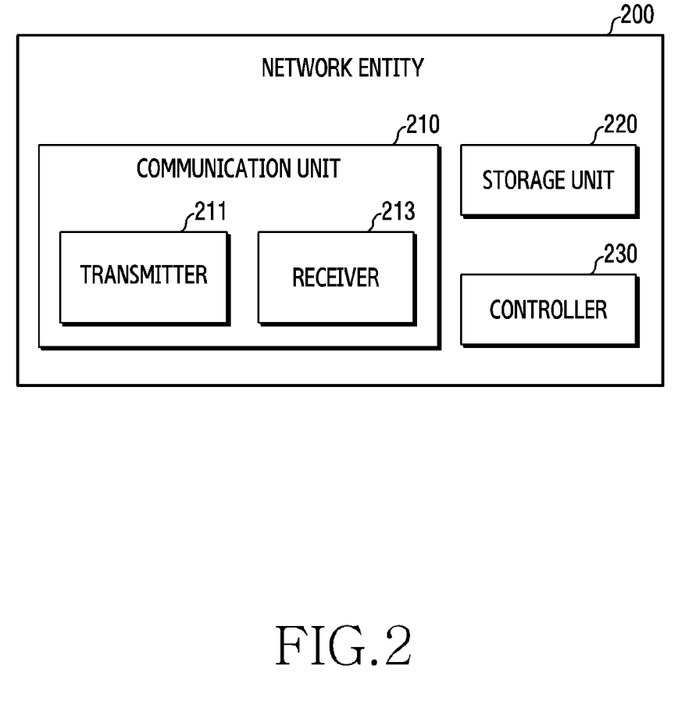
FIG. 2 illustrates the configuration of a network entity in a wireless communication system according to various embodiments.

FIG. 2 illustrates the configuration of a network entity in a wireless communication system according to various embodiments.

The network entity disclosed herein is a concept including a network function according to system implementation. The term 'unit', terms ending in '-or/er', and the like used herein indicate a unit for processing and/or controlling at least one function or operation, which may be implemented as hardware, software, or a combination of hardware and software.

The network entity 200 according to various embodiments may include a communication unit 210, a storage unit 220, and a controller 230 to control overall operations of the network entity 200.

The communication unit 210 transmits and receives a signal to and from other network entities. The entirety or part of the communication unit 210 may be referred to as a transmitter 240, a receiver 250, or a transceiving unit/transceiver 210.

The storage unit 220 stores data, such as a basic program, an application program, and configuration information, for the operation of the network entity 200. The storage unit 220 may include a volatile memory, a nonvolatile memory, or a combination of a volatile memory and a nonvolatile memory. The storage unit 220 provides stored data according to a request of the controller 230.

The controller 230 controls overall operations of the network entity 200. For example, the controller 230 transmits and receives a signal through the communication unit 210. The controller 230 writes and reads data in the storage unit 220. The controller 230 may perform functions of a protocol stack required by a communication standard. To this end, the controller 230 may include a circuit, an application-specific circuit, at least one processor or a microprocessor or may be a part of a processor. Part of the communication unit 210 and the controller 230 may be referred to as a communication processor (CP). The controller 230 may control the network entity 200 to perform any one operation according to various embodiments.

The communication unit 210 and the controller 230 are not necessarily configured as separate modules and may be configured as a single component, such as a single chip or software block. The communication unit 210, the storage unit 220, and the controller 230 may be electrically connected. Operations of the network entity 200 may be realized by including a storage unit 220 storing a corresponding program code in the network entity 200.

The network entity 200 includes a network node and may be any one of a base station (RAN), an AMF, an SMF, a UPF, an NF, an NEF, an NRF, a CF, an NSSF, a UDM, an AF, an AUSF, an SCP, a UDSF, a context storage, an OAM, an EMS, a configuration server, an identifier (ID) management server, and a user equipment (UE).

Figure 3:
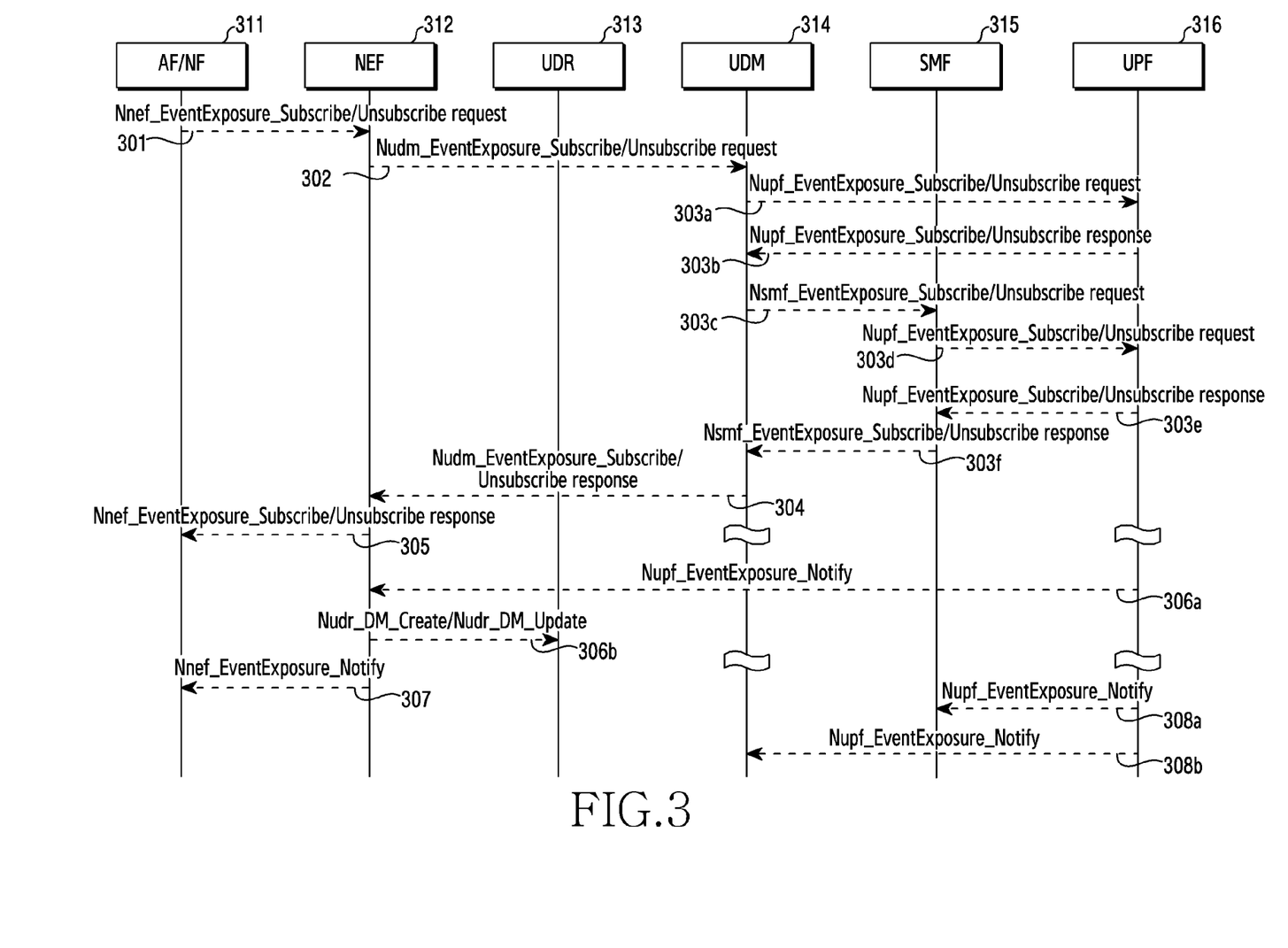
FIG. 3 illustrates a process for an external AF or an internal NF (including an AF) to use a UPF event exposure service in a wireless communication system according to various embodiments.

FIG. 3 illustrates a process for an external AF or an internal NF (including an AF) to use a UPF event exposure service in a wireless communication system according to various embodiments.

In operation 301, an AF/NF 311 transmits a Nnef_EventExposure_Subscribe/Unsubscribe request message about a service subscription or unsubscription request to an NEF 312 in order to subscribe to or unsubscribe from at least one UPF event exposure service identified by an AF event ID. To unsubscribe, the AF/NF 311 also needs to transmit a subscription correlation ID for identifying the existing event service subscription. A subscription request message needs to include the following parameters. When the AF/NF 311 is an internal NF, the AF/NF 311 does not need to transmit the message to the NEF 312 and thus transmits a subscription or unsubscription request message including the following parameters to a UDM 314 in operation 302:

(1) Event ID(s): ID for identifying event exposure services for subscription;

(2) Target of event reporting: Target of event to be observed;

(2-1) One of terminal IDs, such as generic public subscription identifier (GPSI) or external group identifier, when the target to be observed is a terminal;

(2-2) One of terminal IDs, such as GPSI, subscription permanent identifier (SUPI), or internal group identifier, when the target to be observed is an internal NF;

(2-3) Any combination of information for specifying specific service data flow, such as UE IP address (IPv4 address or IPv6 prefix), UE MAC address, AF service identifier, or data network name (DNN)/single-network slice selection assistance information (S-NSSAI) combination, when the target to be observed is specific service data flow (SDF) or packet flow;

(3) Event reporting information: Defines information related to event reporting, such as, whether to periodically perform event reporting, the maximum number of times event reporting is performed, and until when event reporting is performed;

(4) Notification target address (+ notification correlation ID): Defines an address and subscription-related ID of an NF to receive a notification when an event occurs. If the AF/NF transmits a subscription request on behalf of another NF to receive an event, the AF/NF needs to transmit an address of the NF to receive the event and an address of the AF/NF together in order to change subscription information;

(5) Event filter information: Defines event parameter types and event parameter value(s), which define a condition under which a subscribed event is notified of and the value thereof. For example, the event parameter types may be an "area of interest", and the event parameter value(s) may be a list of tracking areas (TAs); And/or (6) Expiry time: Defines the duration of subscription.

The AF/NF 311 specifies an address thereof as a notification target address and also specifies a value for identifying packet flow, such as a UE IP address/IPv4 prefix, a UE MAC address, an AF service identifier, or a DNN/S-NSSAI combination, along with a GPSI/SUPI or an external group identifier/internal group identifier in the target of event reporting in order to subscribe to the event exposure service to a UPF through which specific SDF or packet flow passes.

In operation 302, the NEF 312 transmits a Nudm_EventExposure_Subscribe/Unsubscribe request message about a service subscription or unsubscription request to the UDM 314 in order to subscribe to or unsubscribe from the UPF event exposure service to the UPF through which the specific SDF or packet flow passes. To unsubscribe, the NEF 312 also needs to transmit the subscription correlation ID for identifying the existing event service subscription. When the NEF 312 receives an AF service identifier as the value of the target of event reporting, the NEF 312 changes the AF service identifier to a DNN/S-NSSAI combination. The NEF 312 transmits information received from the AF 311 in operation 301 and information of the notification target address to which an address of the NEF 312 is added. Adding the address of the NEF 312 to the notification target address is for the NEF 312 to receive a notification of a change of subscription information when the change of the subscription information occurs in the UDM 314. When a subscription to the service is authorized by the UDM 314, the UDM 314 stores an event trigger and an identity of a requester.

The UDM 314 converts a GPSI or external group identifier received from the NEF 312 into a SUPI or SUPI list, which is a terminal ID usable inside a network. The UDM 314 may perform two methods to subscribe to an event exposure service with respect to an appropriate UPF 316. A first method is finding an appropriate UPF 316 and directly subscribing to a service, and a second method is subscribing to a UPF service through an SMF 315 that manages an appropriate UPF 316.

Operation 303a and operation 303b relate to a method in which the UDM 314 immediately finds an appropriate UPF 316 and directly subscribes to a UPF event exposure service. In operation 303a, the UDM 314 transmits a Nupf_Event-Exposure_Subscribe/Unsubscribe request message about a service subscription or unsubscription request to the UPF 316 in order to subscribe to or unsubscribe from the UPF event exposure service to the UPF 316 through which the specific SDF or packet flow passes. To unsubscribe, the UDM 314 also needs to transmit the subscription correlation ID for identifying the existing event service subscription. When a plurality of UEs or even one UE receives event exposure service subscription requests for a plurality of packet flows, the UDM 314 needs to transmit a service subscription request to all corresponding UPFs. The UDM 314 transmits the information received from the NEF 312 in operation 302 and the notification target address to which an address of the UDM 314 is added, which is for the UDM 314 to receive a notification of a change of the subscription information when the change of the subscription information occurs in the UPF 316. When the subscription to the service is authorized by the UPF 316, the UPF 316 stores the event trigger and the identity of the requester. In operation 303b, the UPF 316 transmits a Nupf_EventExposure_Subscribe/ Unsubscribe response message to the UDM 314 in response to the subscription to or unsubscription from the service. This message may include the subscription correlation ID and an expiry time.

Operation 303c to operation 303f relate to a method in which the UDM 314 subscribes to a UPF event exposure service through the SMF 315 that manages the appropriate UPF 316. In operation 303c, the UDM 314 transmits a Nsmf_EventExposure_Subscribe/Unsubscribe request message about a service subscription or unsubscription request to the SMF 315 in order to subscribe to or unsubscribe from the UPF event exposure service to the UPF 316 through which the specific SDF or packet flow passes. To unsubscribe, the UDM 314 also needs to transmit the subscription correlation ID for identifying the existing event service subscription. When a plurality of UEs or even one UE receives event exposure service subscription requests for a plurality of packet flows, the UDM 314 needs to transmit a service subscription request to all corresponding SMFs. The UDM 314 transmits the information received from the NEF 312 in operation 302 and the notification target address to which an address of the UDM 314 is added, which is for the UDM 314 to receive a notification of a change of the subscription information when the change of the subscription information occurs in the SMF 315. When the subscription to the service is authorized by the SMF 315, the SMF 315 stores the event trigger and the identity of the requester.

In operation 303d, the SMF 315 transmits a Nupf_EventExposure_Subscribe/Unsubscribe request message about a service subscription or unsubscription request to the UPF 316 in order to subscribe to or unsubscribe from the UPF event exposure service to the UPF 316 through which the specific SDF or packet flow passes. To unsubscribe, the SMF 315 also needs to transmit the subscription correlation ID for identifying the existing event service subscription. When a plurality of UEs or even one UE receives event exposure service subscription requests for a plurality of packet flows, the SMF 315 needs to transmit a service subscription request to all corresponding UPFs that the SMF 315 manages. The SMF 315 transmits the information received from the UDM 314 in operation 303c and the notification target address to which an address of the SMF 315 is added, which is for the SMF 315 to receive a notification of a change of the subscription information when the change of the subscription information occurs in the UPF 316. When the subscription to the service is authorized by the UPF 316, the UPF 316 stores the event trigger and the identity of the requester. In operation 303e, the UPF 316 transmits a Nupf_EventExposure_Subscribe/Unsubscribe response message to the SMF 315 in response to the subscription to or unsubscription from the service. This message may include the subscription correlation ID and an expiry time.

In operation 303f, the SMF 315 transmits a Nsmf_EventExposure_Subscribe/Unsubscribe response message to the UDM 314 in response to the subscription to or unsubscription from the service. This message may include the subscription correlation ID and the expiry time.

In operation 304, the UDM 314 transmits a Nudm_EventExposure_Subscribe/Unsubscribe response message to the NEF 312 in response to the subscription to or unsubscription from the service. This message may include the subscription correlation ID and the expiry time.

In operation 305, the NEF 312 transmits a Nnef_Event-Exposure_Subscribe/Unsubscribe response message to the AF 311 in response to the subscription to or unsubscription from the service. This message may include the subscription correlation ID and the expiry time.

In operations 306a/306b, after detecting the occurrence of an event, the UPF 316 transmits an event report along with a time stamp to the NEF 312 through a Nupf_EventExposure_Notify message in order to notify of the occurrence of the event. The NEF 312 may store information of the event report with the time stamp in the UDR 313 using a Nudr_DM_Create or Nudr_DM_Update message.

In operation 307, the NEF 312 transmits a Nnef_Event-Exposure_Notify message including the information of the received event report to the AF 311. When the internal NF subscribes to the UPF event exposure service, this notification is directly forwarded to the NF without going through the NEF 312.

In operations 308a/308b, when there is a change in the subscription information, the UPF 316 may notify the UDM 314 or the SMF 315 of the occurrence of the change in the subscription information along with the subscription correlation ID through a Nupf_EventExposure_Notify message.

Figure 4:
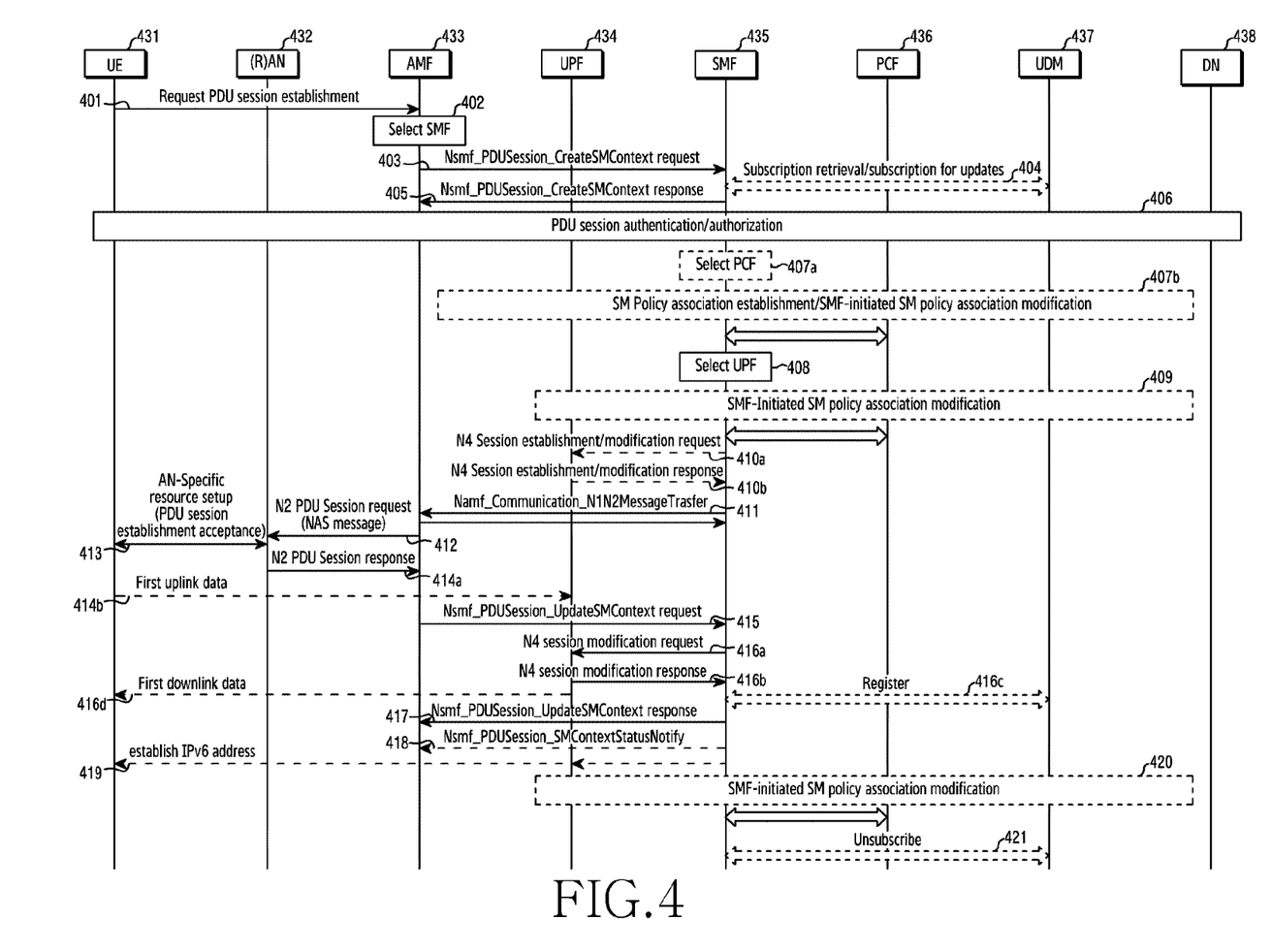
FIG. 4 illustrates a process in which a UE registers a UE IP address (IPv4 or IPv6), a UE MAC address, and a UPF that is in charge of a PDU session in a UDM when performing a PDU session establishment procedure in a wireless communication system according to various embodiments.

FIG. 4 illustrates a process in which a UE registers a UE IP address (IPv4 or IPv6), a UE MAC address, and a UPF that is in charge of a PDU session in a UDM when performing a PDU session establishment procedure in a wireless communication system according to various embodiments.

In operations 401 to 416b, the UE 431 requests a network to generate a PDU session in order to generate a new PDU session and to hand over an existing PDU session.

In operation 401, the UE 431 transmits a PDU session establishment request message to an AMF 433. The AMF 433 and an SMF 435 process a PDU session establishment request.

In operation 403, to generate a PDU session, the AMF 433 selects an appropriate SMF 435 and transmits a Nsmf_P-DUSession_CreateSMContext request message to the SMF 435.

In operation 404, the SMF 435 obtains session management subscription data related to PDU session generation from a UDM 437. That is, the SMF 435 and the UDM 437 perform subscription retrieval/subscription for updates.

In operation 405, the SMF 435 transmits a Nsmf_P-DUSession_CreateSMContext response message to the AMF 433.

In operation 406, PDU session authentication/authorization is performed.

Subsequently, the SMF 435 selects a PCF 436 and obtains default PCC rules for the PDU session.

In operation 407a, the SMF 435 selects the PCF 436.

In operation 407b, SM policy association establishment/SMF-initiated SM policy association modification is performed.

The SMF 435 selects an appropriate UPF 434 for the PDU session and generates an N4 session with the UPF 434.

In operation 408, the SMF 435 selects the UPF 434.

In operation 409, SMF-initiated SM policy association modification is performed.

In operation 410a, the SMF 435 transmits an N4 session establishment/modification request message to the UPF 434.

In operation 410b, the UPF 434 transmits an N4 session establishment/modification response message to the SMF 435.

To generate a GTP-U tunnel between a NG-RAN 432 and the UPF 434 for user data transmission, the NG-RAN 432 and the UPF 434 exchange individual CN tunnel information through the SMF 435.

In operation 411, the SMF 435 and the AMF 433 exchange a Namf_Communication_N1N2MessageTrasfer message.

Further, the SMF 435 and the AMF 433 notify the UE 431 that the PDU session has been successfully generated through a PDU session establishment accept message and forwards a UE IP address (IPv4 or IPv6) or UE MAC address allocated to the PDU session.

In operation 412, the AMF 433 transmits a NAS message including an N2 PDU session request to the NG-RAN 432.

In operation 413, the NG-RAN 432 and the UE 431 exchange PDU session establishment accept messages including an AN-specific resource setup.

In operation 414a, the NG-RAN 432 transmits an N2 PDU session response message to the AMF 433.

In operation 414b, the UE 431 transmits first uplink data to the UPF 434.

In operation 415, the AMF 433 transmits a Nsmf_P-DUSession_UpdateSMContext request message to the SMF 415.

In operation 416a, the SMF 435 transmits an N4 session modification request message to the UPF 434.

In operation 416b, the UPF 434 transmits an N4 session modification response message to the SMF 435.

In operation 416c, the SMF 435 registers the PDU session with the UDM 437 through a Nudm_UECM_Registration operation. Here, the SMF transmits a SUPI, a DNN, a S-NSSAI, a PDU session ID, and an SMF identity and additionally transmits a UE IP address (IPv4 or IPv6), a UE MAC address, and a UPF identity. The UDM 437 stores the following information for the PDU session: the SUPI, the SMF identity, the DNN, the S-NSSAI, the PDU session ID, the UE IP address (IPv4/IPv6), the UE MAC address, and the UPF identity. The UDM 437 may store the following information in a UDR using a Nudr_DM_Update operation; the SUPI, subscription data, and UE context in SMF data.

The following pieces of information listed in Table 1 from the UE context in the SMF data are stored in the UDM 437.

TABLE 1

| UE context in SMF data | |
|---|---|
| SUPI | Key. |
| PDU Session Id(s) | List of PDU Session Id(s) for the UE. |
| | Fo7r emergency PDU Session Id: |
| Emergency Information | The PGW-C + SMF FQDN for emergency session used for interworking with EPC. |
| | For each non-emergency PDU Session Id: |
| DNN | DNN for the PDU Session. |
| SMF | Allocated SMF for the PDU Session. Includes SMF IP Address and SMF NF Id. |
| PGW-C + SMF FQDN | The S5/S8 PGW-C + SMF FQDN used for interworking with EPS (see NOTE 5). |
| UE IP address | It can be either IPv4 address or IPv6 Prefix |
| UPF Identity | UPF Identity |

In operation 416d, the UPF 434 transmits first downlink data to the UE 431.

In operation 417, the SMF 435 transmits a Nsmf_PDUSession_UpdateSMContext response message to the AMF 433.

In operation 418, the SMF 435 transmits a Nsmf_PDUSession_SMContextStatusNotify message to the AMF 433.

In operation 419, the SMF 435 establishes an IPv6 address.

In operation 420, SMF-initiated SM policy association modification is performed.

In operation 421, unsubscription is performed.

Figure 5:
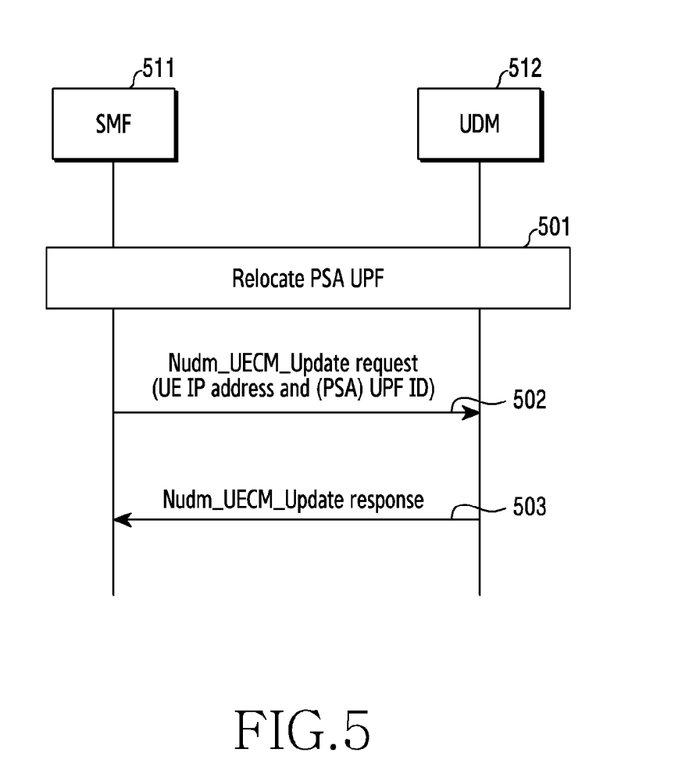
FIG. 5 illustrates a process of updating a (PSA) UPF ID and a UE IP address in a UDM when a PSA UPF is relocated in a wireless communication system according to various embodiments.

FIG. 5 illustrates a process of updating a (PSA) UPF ID and a UE IP address in a UDM when a PSA UPF is relocated in a wireless communication system according to various embodiments.

In operation 501, a PDU session anchor (PSA) user plane function (UPF) is relocated.

In operation 502, an SMF 511 transmits a Nudm_UECM_Update request message to the UDM 512 to update UE context in SMF data after the PSA UPF is relocated. A parameter in the Nudm_UECM_Update request message may include at least one of an NF ID, a SUPI, and an NF type. In particular, a (PSA) UPF ID and a UE IP address changed due to the relocation of the PSA UPF are added and transmitted. Accordingly, the UDM 512 may store the UPF ID and the UE IP address changed due to the relocation of the PSA UPF.

In operation 503, the UDM 512 transmits a Nudm_UECM_Update response message to the SMF 511.

Figure 6:
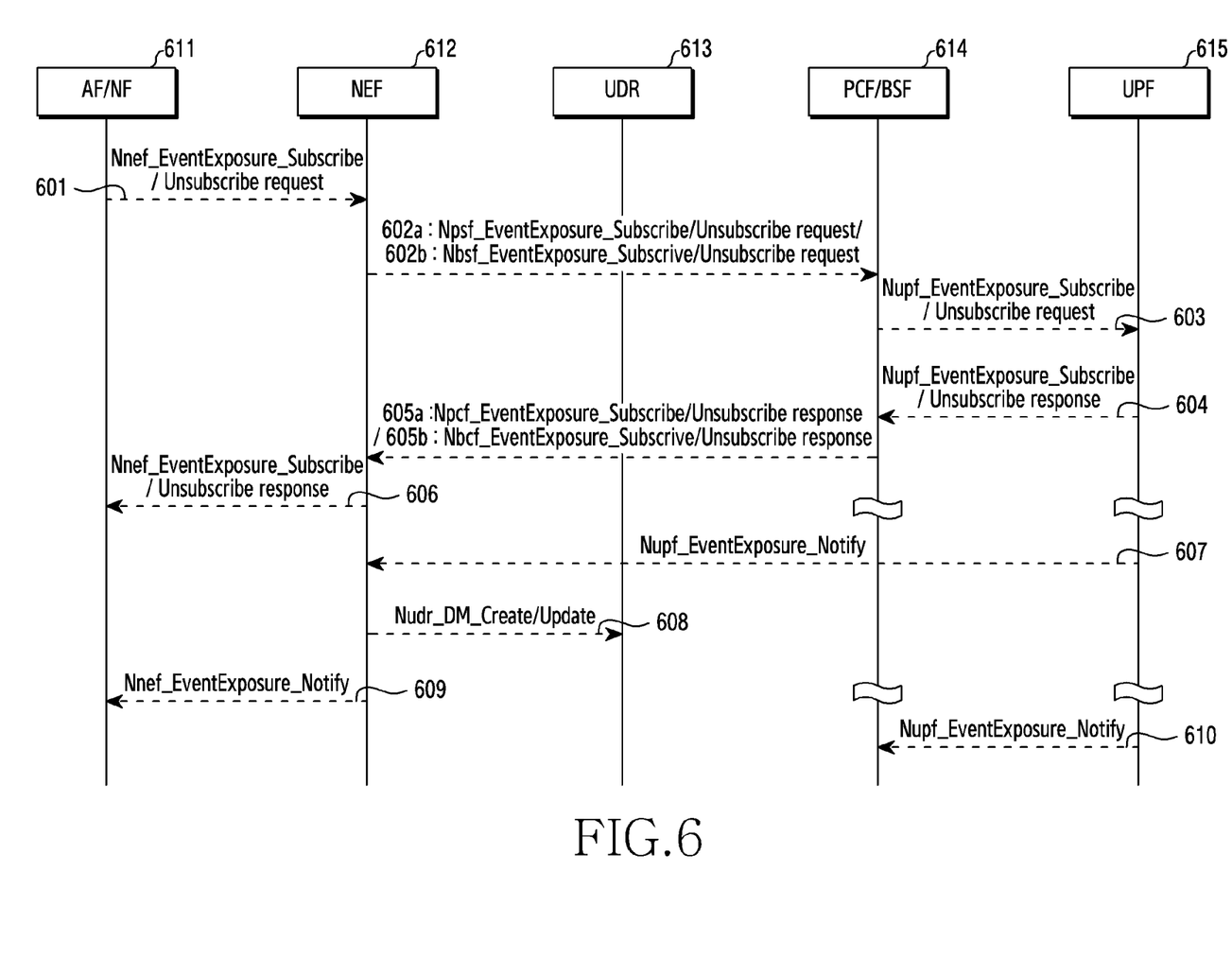
FIG. 6 illustrates a process in which an external AF or an internal NF (including an AF) uses a PCF or BSF to subscribe to a UPF event exposure service in a wireless communication system according to various embodiments.

FIG. 6 illustrates a process in which an external AF or an internal NF (including an AF) uses a PCF or BSF to subscribe to a UPF event exposure service in a wireless communication system according to various embodiments.

An embodiment illustrated in FIG. 6 is the same as the embodiment illustrated in FIG. 3 except that a UPF is retrieved using a policy control function (PCF) or a binding support function (BSF) instead of a UDM.

In operation 601, an AF/NF 611 transmits a Nnef_EventExposure_Subscribe/Unsubscribe request message about a service subscription or unsubscription request to an NEF 612 in order to subscribe to or unsubscribe from at least one UPF event exposure service identified by an AF event ID. To unsubscribe, the AF/NF 311 also needs to transmit a subscription correlation ID for identifying the existing event service subscription. A subscription request message needs to include the following parameters:

(1) Event ID(s): ID for identifying event exposure services for subscription;

(2) Target of event reporting: Target of event to be observed;

(2-1) One of terminal IDs, such as generic public subscription identifier (GPSI) or external group identifier, when the target to be observed is a terminal;

(2-2) One of terminal IDs, such as GPSI, subscription permanent identifier (SUPI), or internal group identifier, when the target to be observed is an internal NF;

(2-3) Any combination of information for specifying specific service data flow, such as UE IP address (IPv4 address or IPv6 prefix), UE MAC address, AF service identifier, or data network name (DNN)/single-network slice selection assistance information (S-NSSAI) combination, when the target to be observed is specific service data flow (SDF) or packet flow;

(3) Event reporting information: Defines information related to event reporting, such as, whether to periodically perform event reporting, the maximum number of times event reporting is performed, and until when event reporting is performed;

(4) Notification target address (+ notification correlation ID): Defines an address and subscription-related ID of an NF to receive a notification when an event occurs. If the AF/NF transmits a subscription request on behalf of another NF to receive an event, the AF/NF needs to transmit an address of the NF to receive the event and an address of the AF/NF together in order to change subscription information;

(5) Event filter information: Defines event parameter types and event parameter value(s), which define a condition under which a subscribed event is notified of and the value thereof. For example, the event parameter types may be an "area of interest", and the event parameter value(s) may be a list of tracking areas (TAs); And/or (6) Expiry time: Defines the duration of subscription.

When the AF/NF 611 is an internal NF, the AF/NF 311 does not need to transmit the message to the NEF and thus transmits a subscription or unsubscription request message including the preceding parameters to a PCF/BSF 614 in operations 602a/602b.

The AF/NF 611 specifies an address thereof as a notification target address and also specifies a value for identifying packet flow, such as a UE IP address/IPv4 prefix, a UE MAC address, an AF service identifier, or a DNN/S-NSSAI combination, along with a GPSI/SUPI or an external group identifier/internal group identifier in the target of event reporting in order to subscribe to the event exposure service to a UPF through which specific SDF or packet flow passes.

In operations 602a/602b, the NEF 612 transmits a Npcf_EventExposure_Subscribe/Unsubscribe request message or a Nbsf_EventExposure_Subscribe/Unsubscribe request message about a service subscription or unsubscription request to the PCF/BSF 614 in order to subscribe to or unsubscribe from the UPF event exposure service to the UPF through which the specific SDF or packet flow passes. To unsubscribe, the NEF 612 also needs to transmit the subscription correlation ID for identifying the existing event service subscription. When the NEF 612 receives an AF service identifier as the value of the target of event reporting, the NEF 612 changes the AF service identifier to a DNN/S-NSSAI combination. The NEF 612 transmits information received from the AF 611 in operation 601 and information of the notification target address to which an address of the NEF 612 is added. Adding the address of the NEF 612 to the notification target address is for the NEF 612 to receive a notification of a change of subscription information when the change of the subscription information occurs in the PCF/BSF 614. When a subscription to the service is authorized by the PCF/BSF 614, the PCF/BSF 614 stores an event trigger and an identity of a requester.

The PCF/BSF 614 converts a GPSI or external group identifier received from the NEF 612 into a SUPI or SUPI list, which is a terminal ID usable inside a network. The PCF/BSF 614 may perform two methods to subscribe to an event exposure service with respect to an appropriate UPF 615. A first method is finding an appropriate UPF 615 and directly subscribing to a service, and a second method is subscribing to a UPF service through an SMF that manages an appropriate UPF 615. The method of subscribing to the UPF service through the SMF is the same as that described in the embodiment of FIG. 3, and thus a description thereof is omitted in this embodiment.

In operation 603, the PCF/BSF 614 transmits a Nupf_EventExposure_Subscribe/Unsubscribe request message about a service subscription or unsubscription request to the UPF 615 in order to subscribe to or unsubscribe from the UPF event exposure service to the UPF 615 through which the specific SDF or packet flow passes. To unsubscribe, the PCF/BSF 614 also needs to transmit the subscription correlation ID for identifying the existing event service subscription. When a plurality of UEs or even one UE receives event exposure service subscription requests for a plurality of packet flows, the PCF/BSF 614 needs to transmit a service subscription request to all corresponding UPFs. The PCF/BSF 614 transmits the information received from the NEF 612 in operations 602a/602b and the notification target address to which an address of the PCF/BSF 614 is added, which is for the PCF/BSF 614 to receive a notification of a change of the subscription information when the change of the subscription information occurs in the UPF 615. When the subscription to the service is authorized by the UPF 615, the UPF 615 stores the event trigger and the identity of the requester. In operation 604, the UPF 615 transmits a Nupf_EventExposure_Subscribe/Unsubscribe response message to the PCF/BSF 614 in response to the subscription to or unsubscription from the service. This message may include the subscription correlation ID and an expiry time.

In operations 605a/605b, the PCF/BSF 614 transmits a Npcf_EventExposure_Subscribe/Unsubscribe response/ Nbsf_EventExposure_Subscribe/Unsubscribe response message to the NEF 612 in response to subscription to or unsubscription from the service. This message may include the subscription correlation ID and the expiry time.

In operation 606, the NEF 612 transmits a Nnef_EventExposure_Subscribe/Unsubscribe response message to the AF 611 in response to the subscription to or unsubscription from the service. This message may include the subscription correlation ID and the expiry time.

In operation 607, after detecting the occurrence of an event, the UPF 615 transmits an event report along with a time stamp to the NEF 612 through a Nupf_EventExposure_Notify message in order to notify of the occurrence of the event.

In operation 608, the NEF 612 may store information of the event report with the time stamp in the UDR using a Nudr_DM_Create or Nudr_DM_Update message.

In operation 609, the NEF 612 transmits a Nnef_EventExposure_Notify message including the information of the received event report to the AF 611. When the internal NF subscribes to the UPF event exposure service, this notification is directly forwarded to the NF without going through the NEF 612.

In operation 610, when there is a change in the subscription information, the UPF 615 may notify the PCF/BSF 614 of the occurrence of the change in the subscription information along with the subscription correlation ID through a Nupf_EventExposure_Notify message.

Figure 7:
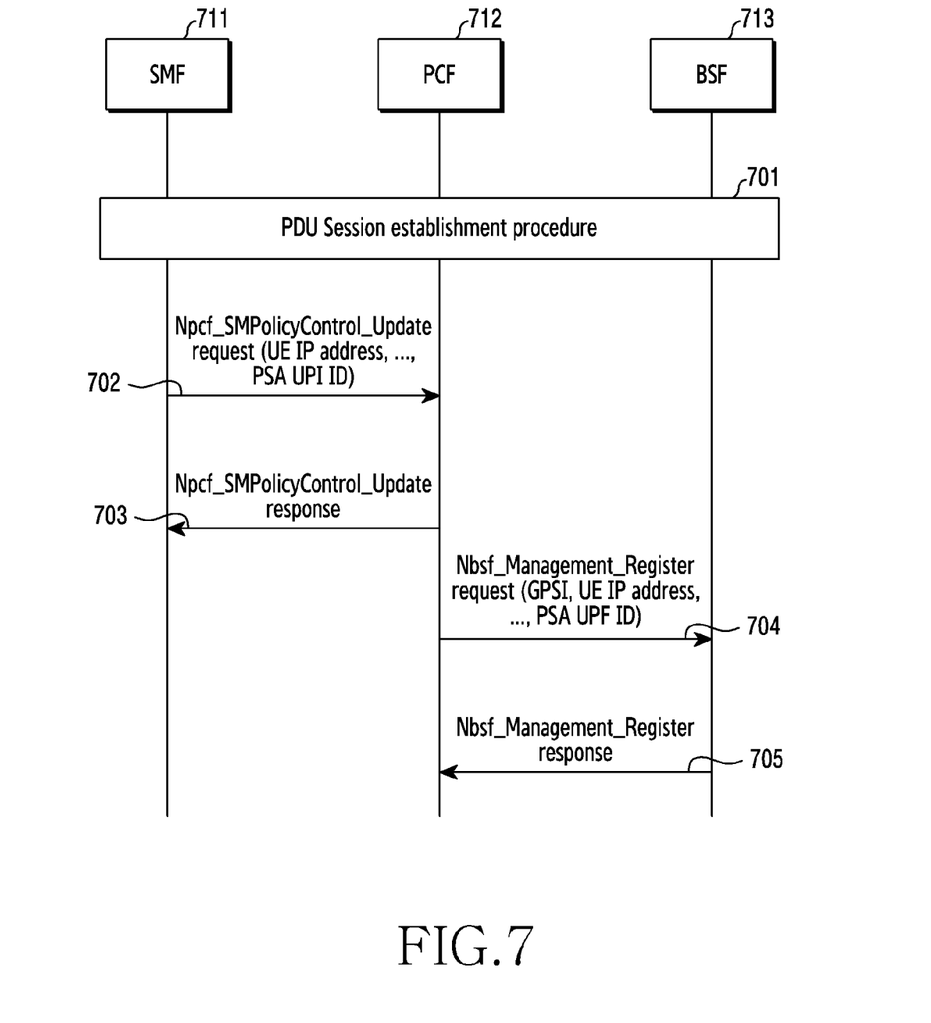
FIG. 7 illustrates a process in which a PCF and a BSF store a UPF ID in order to retrieve a UPF in a wireless communication system according to various embodiments.

FIG. 7 illustrates a process in which a PCF and a BSF store a UPF ID in order to retrieve a UPF in a wireless communication system according to various embodiments.

An embodiment illustrated in FIG. 7 is performed by an SMF-initiated SM policy association modification procedure performed in a PDU session establishment procedure.

In operation 701, the PDU session establishment procedure is performed.

In operation 702, an SMF 711 transmits an Npcf_SMPolicyControl_Update request message to the PCF 712 in order to update SM policy association information about a generated PDU session. A parameter included in the message in operation 702 may include at least one of a SM policy association ID, an IPv4 address and/or an IP6 network prefix, user location information, a UE time zone, a serving network, a RAT type, a session AMBR or subscribed default QoS information, a DN authorization profile index, a MAC address, the port number of a manageable Ethernet port, a UE-DS-TT residence time and port management information container, a MA PDU request indication, and a MA PDU network-upgrade allowed indication. In particular, an ID and an address of a (PSA) UPF in charge of the PDU session are added and transmitted. Accordingly, the PCF 712 can store the ID and the address of the UPF in charge of the generated PDU session.

In operation 703, the PCF 712 transmits a Npcf_SMPolicyControl_Update response message to the SMF 711.

In operation 704, the PCF registers the information about the PDU session in the BSF 713 through a Nbsf_Management_Register request message. The registered information may include at least one of a UE address(es), a SUPI, a GPSI, a DNN, DN information (e.g., S-NSSAI), a PCF address(es), a PCF ID, and a PCF set ID. To register UPF information in the BSF 713, the address(es) and the ID of the UPF are additionally provided. Accordingly, the BSF 713 can store the ID and the address of the UPF in charge of the generated PDU session.

In operation 705, the BSF 713 transmits a Nbsf_Management_Register response message to the SMF 711.

Figure 8:
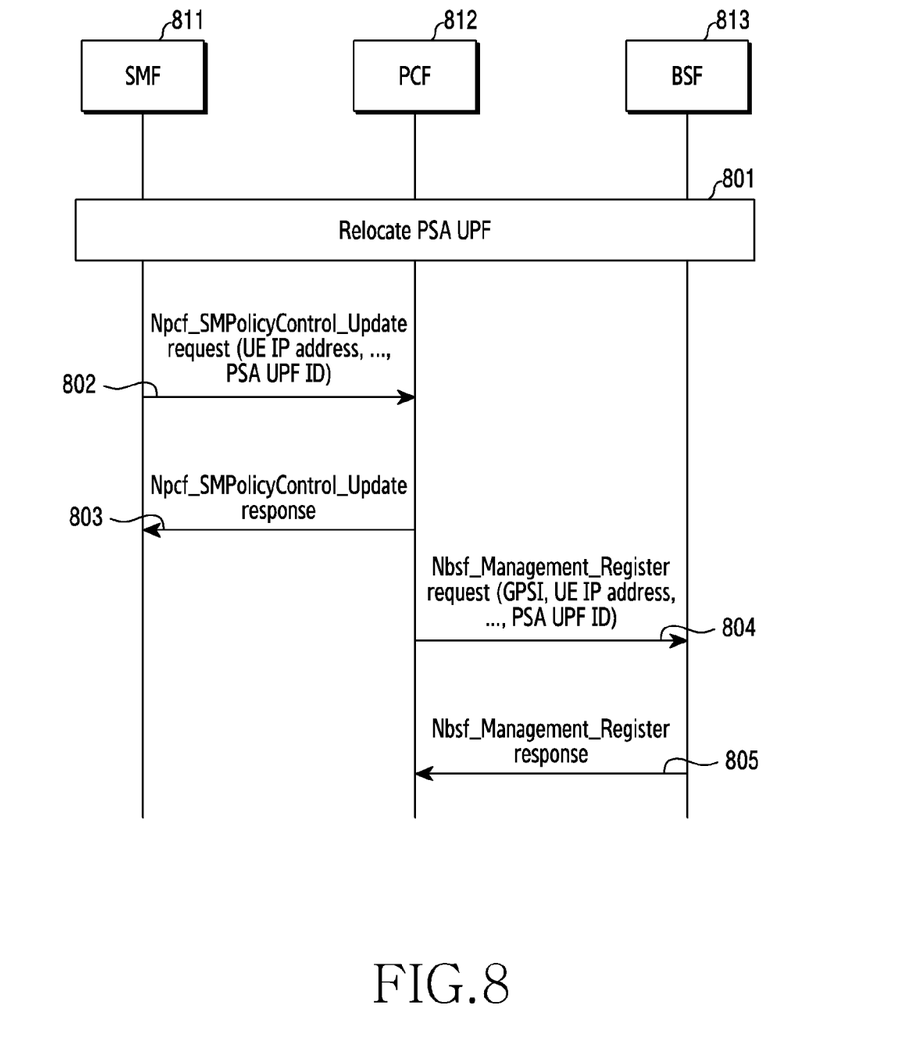
FIG. 8 illustrates a process of updating a (PSA) UPF ID in a PCF and a BSF when a PSA UPF is relocated in a wireless communication system according to various embodiments.

FIG. 8 illustrates a process of updating a (PSA) UPF ID in a PCF and a BSF when a PSA UPF is relocated in a wireless communication system according to various embodiments.

In operation 801, a PSA UPF is relocated.

In operation 802, an SMF 811 transmits a Npcf_SMPolicyControl_Update request message to the PCF 812 to update SM policy association information about a PDU session after the PSA UPF is relocated. A parameter in the Npcf_SMPolicyControl_Update request message may include at least one of a SM policy association ID, an IPv4 address and/or an IP6 network prefix, user location information, a UE time zone, a serving network, a RAT type, a session AMBR or subscribed default QoS information, a DN authorization profile index, a MAC address, the port number of a manageable Ethernet port, a UE-DS-TT residence time and port management information container, a MA PDU request indication, and a MA PDU network-upgrade allowed indication. In particular, a (PSA) UPF ID and a (PSA) UPF address changed due to the relocation of the PSA UPF are added and transmitted. Accordingly, the PCF 812 can store the UPF ID and UPF address changed due to the relocation of the PSA UPF.

In operation 803, the PCF 812 transmits a Npcf_SMPolicyControl_Update response message to the SMF 811.

In operation 804, the PCF 812 updates the information about the PDU session to the BSF 813 through a Nbsf_Management_Update request message. A parameter in the Nbsf_Management_Update request message includes at least one of a binding identifier for the PDU session, a UE address(es), and a PCF ID. To update UPF information to the BSF 813, a UPF address(s) and a UPF ID may be additionally provided. Accordingly, the BSF 813 can store the UPF ID and UPF address changed due to the relocation of the PSA UPF.

In operation 805, the BSF 813 transmits a Nbsf_Management_Register response message to the PCF 812.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. An operating method of a network exposure function (NEF) in a wireless communication system, the method comprising:
    receiving, from an application function (AF), a Nnef_EventExposure_Subscribe message to subscribe to receive information reporting an event for a user equipment's (UE) specific service flow from a user plane function (UPF);
    in response to the Nnef_EventExposure_Subscribe message, transmit, to a binding support function (BSF), a request message including an internet protocol (IP) address of the UE to find the UPF to subscribe to receive the information;
    receiving, from the UPF, a Nupf_EventExposure_Notify message including the subscribed information; and
    in response to the Nupf_EventExposure_Notify message, transmitting, to the AF, a Nnef_EventExposure_Notify message including the subscribed information.

2. The method of claim 1,
    wherein a Nupf_EventExposure_Subscribe message is transmitted to the UPF to subscribe to receive the information, and
    wherein the Nupf_EventExposure_Notify message is received in response to the Nupf_EventExposure_Subscribe message.

3. The method of claim 2, wherein the Nupf_EventExposure_Subscribe message includes an internet protocol (IP) address of the UE.

4. A network exposure function (NEF) in a wireless communication system, the NEF comprising:
    a transceiver; and
    at least one processor operably coupled to the transceiver, and configured to:
        receive, from an application function (AF), a Nnef_EventExposure_Subscribe message to subscribe to receive information reporting an event for a user equipment's (UE) specific service flow from a user plane function (UPF);
        in response to the Nnef_EventExposure_Subscribe message, transmit, to a binding support function (BSF), a request message including an internet protocol (IP) address of the UE to find the UPF to subscribe to receive the information;
        receive, from the UPF, a Nupf_EventExposure_Notify message including the subscribed information; and
        in response to the Nupf_EventExposure_Notify message, transmit, to the AF, a Nnef_EventExposure_Notify message including the subscribed information.

5. The NEF of claim 4, wherein a Nupf_EventExposure_Subscribe message is transmitted to the UPF to subscribe to receive the information, and
    wherein the Nupf_EventExposure_Notify message is received in response to the Nupf_EventExposure_Subscribe message.

6. The NEF of claim 5, wherein the Nupf_EventExposure_Subscribe message includes an internet protocol (IP) address of the UE.

7. An operating method of a user plane function (UPF) in a wireless communication system, the method comprising:
    receiving a Nupf_EventExposure_Subscribe message to subscribe to receive information reporting an event for UE's specific service flow, wherein the Nupf_EventExposure_Subscribe message includes an internet protocol (IP) address of the UE; and
    transmitting, to a network exposure function (NEF), a Nupf_EventExposure_Notify message including the subscribed information,
    wherein a Nnef_EventExposure_Subscribe message including the IP address of UE is transmitted from an application function (AF) to a network exposure function (NEF), and
    wherein, in response to the Nnef_EventExposure_Subscribe message, a request message including the IP address of the UE is transmitted from the NEF to a binding support function (BSF) to find the UPF to subscribe to receive the information.

8. A user plane function (UPF) in a wireless communication system, the UPF comprising:
    a transceiver; and
    at least one processor operably coupled to the transceiver, and configured to:
        receive a Nupf_EventExposure_Subscribe message to subscribe information reporting an event for UE's specific service flow, wherein the Nupf_EventExposure_Subscribe message includes an internet protocol (IP) address of the UE; and transmit, to a network exposure function (NEF), a Nupf_EventExposure_Notify message including the subscribed information, wherein a Nnef_EventExposure_Subscribe message including the IP address of UE is transmitted from an application function (AF) to a network exposure function (NEF), and wherein, in response to the Nnef_EventExposure_Subscribe message, a request message including the IP address of the UE is transmitted from the NEF to a binding support function (BSF) to find the UPF to subscribe to receive the information.

* * * * *